(12) United States Patent
Dutta et al.

(10) Patent No.: US 7,937,457 B2
(45) Date of Patent: *May 3, 2011

(54) DOCKING PLATFORM FOR DEVELOPING PORTABLE PACKET PROCESSING APPLICATIONS IN A NETWORK PROCESSOR

(75) Inventors: Hemanta K. Dutta, Austin, TX (US); Seeta Hariharan, Raleigh, NC (US); Sridhar Rao, Raleigh, NC (US); Yanping Wang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/165,774

(22) Filed: Jul. 1, 2008

(65) Prior Publication Data

US 2008/0270627 A1 Oct. 30, 2008

Related U.S. Application Data

(63) Continuation of application No. 10/760,902, filed on Jan. 20, 2004, now Pat. No. 7,496,684.

(51) Int. Cl.
*G06F 15/177* (2006.01)
*G06F 15/173* (2006.01)

(52) U.S. Cl. .......... 709/220; 709/221; 709/243

(58) Field of Classification Search .......... None
See application file for complete search history.

(56) References Cited

U.S. PATENT DOCUMENTS

| 7,075,926 | B2 * | 7/2006 | Cathey et al. | 370/389 |
|---|---|---|---|---|
| 7,171,505 | B2 * | 1/2007 | Kuhlmann et al. | 710/305 |
| 7,236,492 | B2 * | 6/2007 | Davis et al. | 370/392 |
| 7,424,710 | B1 * | 9/2008 | Nelson et al. | 718/1 |
| 7,496,684 | B2 * | 2/2009 | Dutta et al. | 709/243 |
| 7,508,828 | B2 * | 3/2009 | Ng et al. | 370/392 |
| 2002/0023168 | A1 * | 2/2002 | Bass et al. | 709/232 |
| 2002/0116605 | A1 * | 8/2002 | Berg | 713/1 |
| 2002/0120761 | A1 * | 8/2002 | Berg | 709/230 |
| 2002/0136208 | A1 * | 9/2002 | Skirmont et al. | 370/352 |
| 2002/0154646 | A1 * | 10/2002 | Dubois et al. | 370/406 |
| 2008/0270627 | A1 * | 10/2008 | Dutta et al. | 709/243 |
| 2009/0147789 | A1 * | 6/2009 | Ng et al. | 370/392 |

* cited by examiner

*Primary Examiner* — David E England
(74) *Attorney, Agent, or Firm* — Yee & Associates, P.C.; Yuanmin Cai

(57) ABSTRACT

An apparatus for developing portable packet processing applications on network processors includes a docking platform which provides a common interface for individual packet processing applications to be plugged into the network processing environment. Each application interacts with the docking platform through the common interfaces provided by the latter. The docking platform interacts with the other modules inside the system to accomplish the requests from the application. In this manner, the applications become "shielded" from the implementation details of the underlying hardware. The applications need not change when the network processor hardware features are changed. It therefore provides a universal packet processing programming environment in which applications can execute in a portable and flexible manner in various hardware architectures.

12 Claims, 7 Drawing Sheets

| | |
|---|---|
| ppa_appl_process_media_pkt | appl_process_media_pkt |
| ppa_appl_process_gmt_pkt | appl_process_gmt_pkt |
| ppa_appl_process_time_out | appl_process_time_out |
| ppa_appl_process_enable | appl_process_enable |
| ppa_appl_process_disable | appl_process_disable |
| ppa_appl_process_reset | appl_process_reset |
| ppa_appl_process_config | appl_process_config |
| ppa_appl_process_pause | appl_process_pause |
| ppa_appl_process_resume | appl_process_resume |
| ppa_appl_process_terminate | appl_process_terminate |
| ppa_appl_process_status_query | appl_process_status_query |

FIG. 5

DOCKING PLATFORM FOR DEVELOPING PORTABLE PACKET PROCESSING APPLICATIONS IN A NETWORK PROCESSOR

CROSS-REFERENCE TO RELATED APPLICATIONS

Under 35 USC §120, this application is a continuation application and claims the benefit of priority to U.S. patent application Ser. No. 10/760,902, filed Jan. 20, 2004, entitled "Developing Portable Packet Processing Applications in a Network Processor," which is incorporated herein by reference.

FIELD OF THE INVENTION

The present invention relates to network processors, and more particularly, to packet processing applications in a network processor.

BACKGROUND OF THE INVENTION

For packet processing applications running on top of conventional network processors, it is almost mandatory for them to use the underlying hardware facilities to process packets. FIG. 1 illustrates a conventional packet processing system in a network processor. The system includes a packet processing applications (PPA) 107, 108 or 109 executing on network processors 101, 102 or 103, respectively, and interacting with the latter through hardware interfaces 104, 105 or 106, respectively The PPA receives media or GMT packets, process the packets and subsequently transmit (or discard) the processed packet by interacting with the network processor's hardware interfaces. As shown, the network processors 101, 102 and 103 may be different versions of the same basic architecture or a completely different architecture from the same or different manufacturer. Accordingly, the hardware interfaces 104, 105 and 106 provided by the network processors 101, 102 and 103 respectively may be different. When so, different versions of the same PPA, 107, 108 and 109, are required to be developed in order for it to execute on the network processors 101, 102 and 103. Media Packets refer to those packets that arrive through media ports such as Ethernet or ATM ports and are typically processed by the PPA. In the art, they are also termed as Data Packets. GMT (Generic Message Transfer) Packets refers to those packets that serve to control and administer the overall behavior of the PPA. In the art, they are also termed as Control Packets.

However, with this conventional system, the applications directly utilize the specific hardware facilities of the network processor. When an application becomes directly dependent on a specific hardware architecture, it loses its flexibility in function as well as its portability across platforms. The implementation of one application tailored to one platform will inevitably fail on another platform because the other platform uses different mechanisms. Sometimes, the application needs to be changed just because hardware functions are changed without changes in platform.

With the conventional system, customers need to have a comprehensive understanding of the hardware architecture before they can start any implementation or change any of the current solutions. In addition, they need to update their implementations whenever the network processor hardware features are changed. This limits the applicability of their solution and delays their time to market.

Accordingly, there exists a need for a method and apparatus for developing portable packet processing applications on network processors. The method and apparatus should provide flexibility and portability to packet processing across platforms. The present invention addresses such a need.

SUMMARY OF THE INVENTION

A method and apparatus for developing portable packet processing applications on network processors includes a docking platform which provides a common interface for individual packet processing applications to be plugged into the network processing environment. Each application interacts with the docking platform through common interfaces provided by the latter. The docking platform interacts with the other modules inside the system to accomplish the requests from the application. In this manner, the applications become "shielded" from the implementation details of the underlying hardware. The applications need not change when the network processor hardware features are changed. It therefore provides a universal packet processing programming environment in which applications can execute in a portable and flexible manner in various hardware architectures.

BRIEF DESCRIPTION OF THE FIGURES

FIG. 5 illustrates an example application procedure bind table for a PPA instance in accordance with the present invention.

DETAILED DESCRIPTION

The present invention provides a method and apparatus for portable packet processing for network processor applications. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 8 in conjunction with the discussion below.

Figure 1:
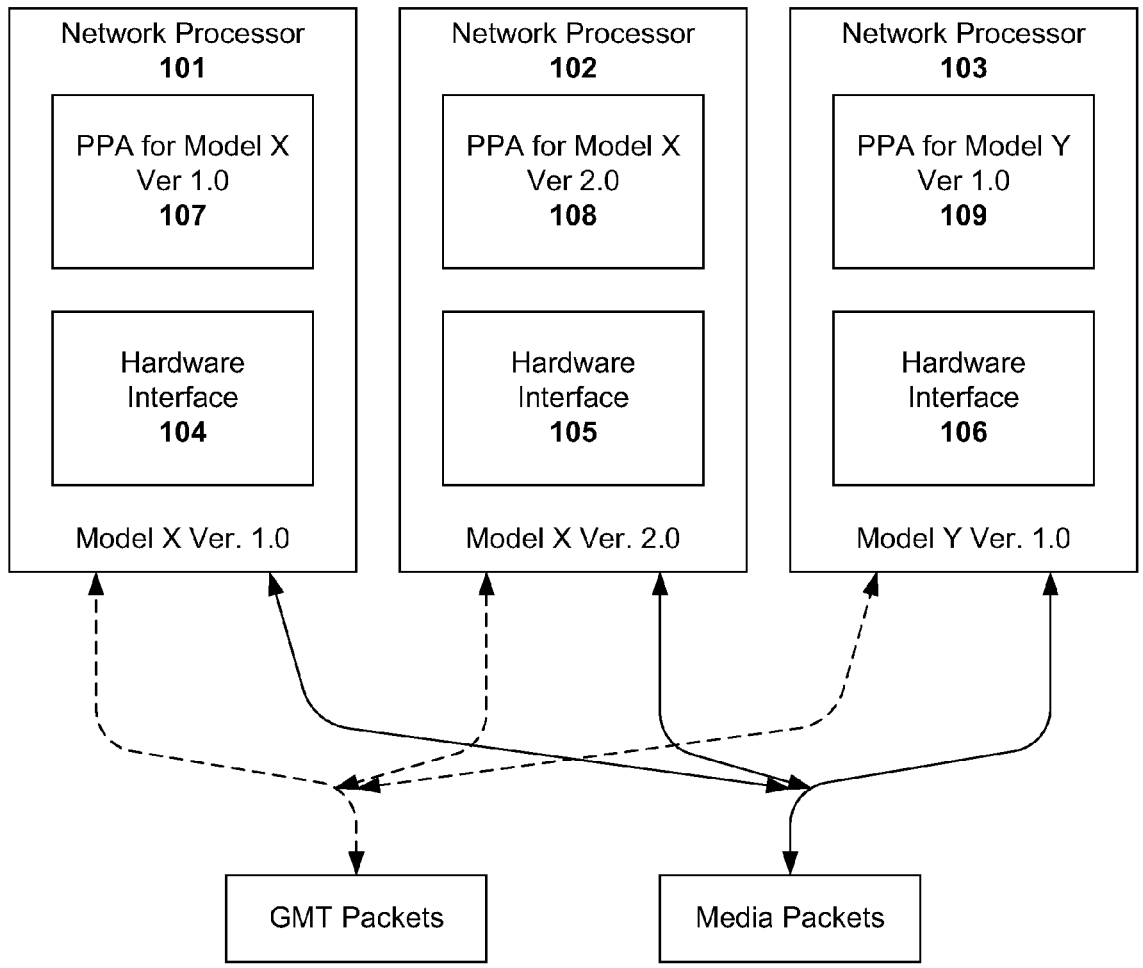
FIG. 1 illustrates a conventional packet processing system in a network processor.
Figure 2:
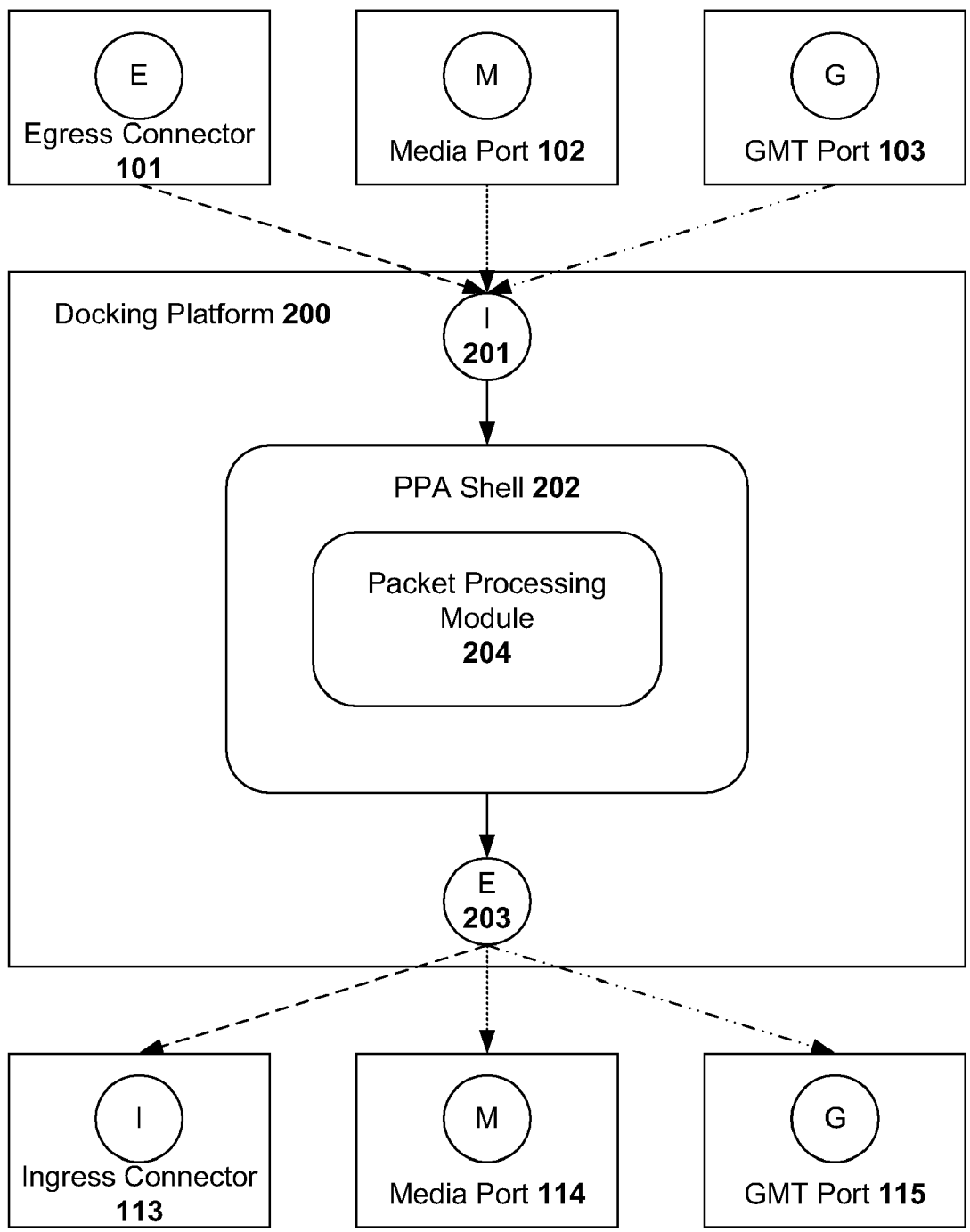
FIG. 2 illustrates a preferred embodiment of a docking platform for portable packet processing for network processor applications in accordance with the present invention.

FIG. 2 illustrates a preferred embodiment of a docking platform for portable packet processing for network processor applications in accordance with the present invention. In the preferred embodiment, a packet processing application (PPA) instance comprises a docking platform 200. The docking platform 200 is a common interface for the individual applications to be plugged into the PPA instance. The docking platform 200 allows the applications to execute in a portable and flexible manner by performing common PPA behaviors, which include: mechanism for packet entry, mechanism for packet exit, overall state model, and interfaces to invoke application specific behavior.

In the preferred embodiment, the docking platform 200 comprises an ingress connector 201 as the common mechanism for packet entry, a PPA shell 202 to perform common behaviors and for providing entry points to invoke application specific behavior, and an egress connector 203 as the common mechanism for packet exit. The entry points to invoke application specific behavior are provided by a packet processing module 204 within the PPA shell 202. The PPA shell and the packet processing module 204 will be described further below with reference to FIGS. 4 and 5.

Figure 3:
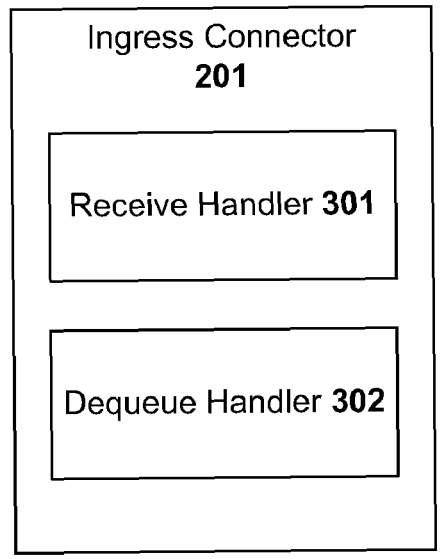
FIG. 3 illustrates in more detail the ingress connector of the docking platform in accordance with the present invention.

FIG. 3 illustrates in more detail the ingress connector 201 of the docking platform 200 in accordance with the present invention. The ingress connector 201 allows other entities in the packet processing environment to pass packets to the applications associated with the docking platform 200. In the preferred embodiment, the ingress connector 201 comprises two functions: a receive handler 301 and a dequeue handler 302. The receive handler 301 enqueues received packets onto an ingress queue. One or more queues may be used by the ingress connector 201. The receive handler 301 can be called by the egress connector 101, the media port 102, or the GMT port 103 (see FIG. 2). The dequeue handler 302 is called by the PPA shell 202, and dequeues the packets from the ingress queue(s) and passes them to the Packet Processing Module 204.

Figure 4:
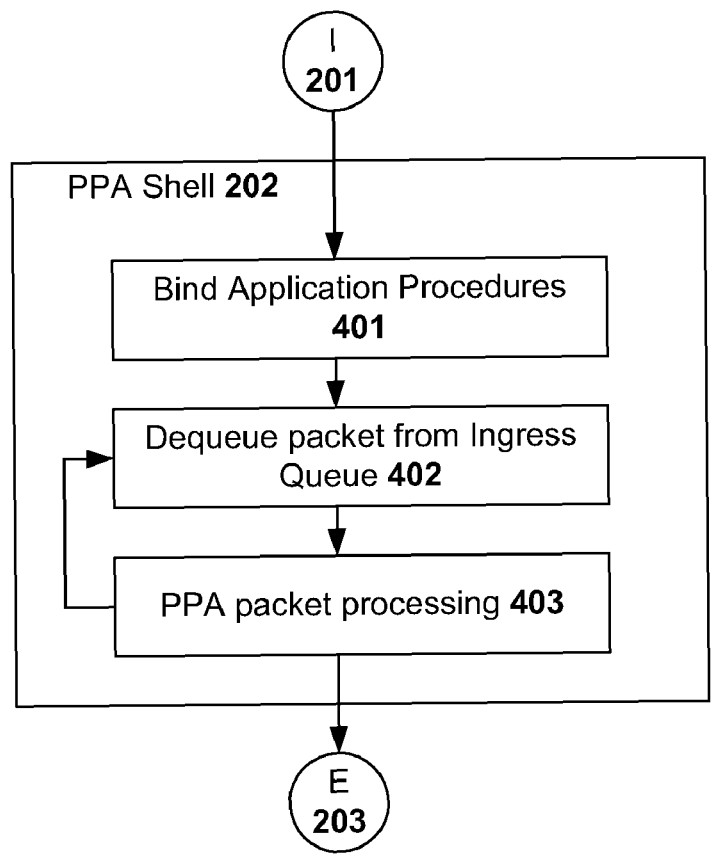
FIG. 4 illustrates in more detail the PPA shell of the docking platform in accordance with the present invention.

FIG. 4 illustrates in more detail the PPA shell 202 of the docking platform 200 in accordance with the present invention. Upon initialization of the PPA instance, the PPA shell 202 binds application procedures, via step 401, for its associated applications. In binding the application, the application modules are associated with the entry points defined in the PPA shell 202. The entry points represent common interfaces between the docking platform 200 and the specific application modules. The application modules are provided by the user of the system. These interfaces allow the modules to be implemented independently of the hardware facilities of the network processor.

In the preferred embodiment, the PPA shell 202 binds an application procedure to specific entry points using a procedure bind table. The table contains function pointers to application procedures (i.e., callbacks) that the PPA instance needs to register with the PPA shell 202. These procedures are invoked by the PPA Shell 202 upon receipt of the inbound packets via the ingress connector 201. The application procedure bind table also includes pointers to the application data context and the application control context. The application data context refers to data structures defined and used by the application during media packet processing. The application control context refers to data structures defined and used by the application during GMT packet processing. The application procedure bind table is bound once, upon initialization of the PPA instance.

FIG. 5 illustrates an example application procedure bind table for a PPA instance in accordance with the present invention. The application specific functions are bound by calling the ppa_appl_proc_bind function. The application specific functions listed in the column on the right, defined by the application, are bound respectively to the PPA shell functions listed in the column on the left. A PPA shell function can then be called by the PPA shell 202, which leads to the execution of the application specific function bound to it.

In this example, the ppa_appl_process_media_pkt function is called by the PPA shell 202 to process media packets. The ppa_appl_process_gmt_pkt function is called by the PPA shell 202 to pass GMT service packets to the application for processing. Its input parameters include a pointer to the GMT service packet that needs to be processed.

The ppa_appl_process_time_out function is called by the PPA shell 202 to notify the application of time out events. Its output parameters include the number of ticks to wait for a response if the timer is restarted. It returns a value indicating whether the application wants to restart the timer and continue waiting, is ready to dequeue and process a new packet from the ingress queue using steps 402 and 403 or wants to resume processing of the incumbent packet.

The ppa_appl_process_enable function is called by the PPA shell 202 during PPA enablement, giving the application an opportunity to allocate resources, initialize data, or configure parameters before the application is enable to process packets.

The ppa_appl_process_diable function is called by the PPA shell 202 during PPA disablement, giving an opportunity for the application to release all resources, and perform any other activities to bring itself to a non-operational state.

The ppa_appl_process_reset function is called by the PPA shell 202 when the PPA is reset, giving an opportunity for the application to release all resources, assume default operating parameters, and perform any other activities associated with bringing itself to an initial operational state.

The ppa_appl_process_config function is called by the PPA shell 202 to perform application configuration. This operation sets the configuration parameters for the next application enablement. Its input parameters includes the length of the configuration data in words and a pointer to the application configuration data that are needed in this operation.

The ppa_appl_process_pause function is called by the PPA shell 202 when the application needs to be paused. It indicates that the PPA is about to transfer into a "paused" state. The states of a PPA instance are further described below with FIG. 8.

The ppa_appl_process_resume function is called by the PPA shell 202 when the PPA changes its state from "paused" to "enabled". It provides an opportunity for the application to perform any operation necessary for the transition.

The ppa_appl_process_terminate function is called by the PPA shell 202 when the PPA is about to be terminated. At the minimum, the application should free the service handler tables, the data and control context areas that were allocated when the application was created.

The ppa_appl_process_status_query function is called by the PPA shell 202 when the current application status is being queried.

After binding the application procedures, via step 401, the PPA shell 202 calls the dequeue handler 302 of the ingress connector 201, which dequeues a packet from its queue, via step 402, and passes it to the packet processing module 204. The packet is then processed by the packet processing module 204, via step 403. The processed packet can then be transmitted out of the system via the egress connector 203 or discarded. The packet processing then continues in a loop.

Figure 6:
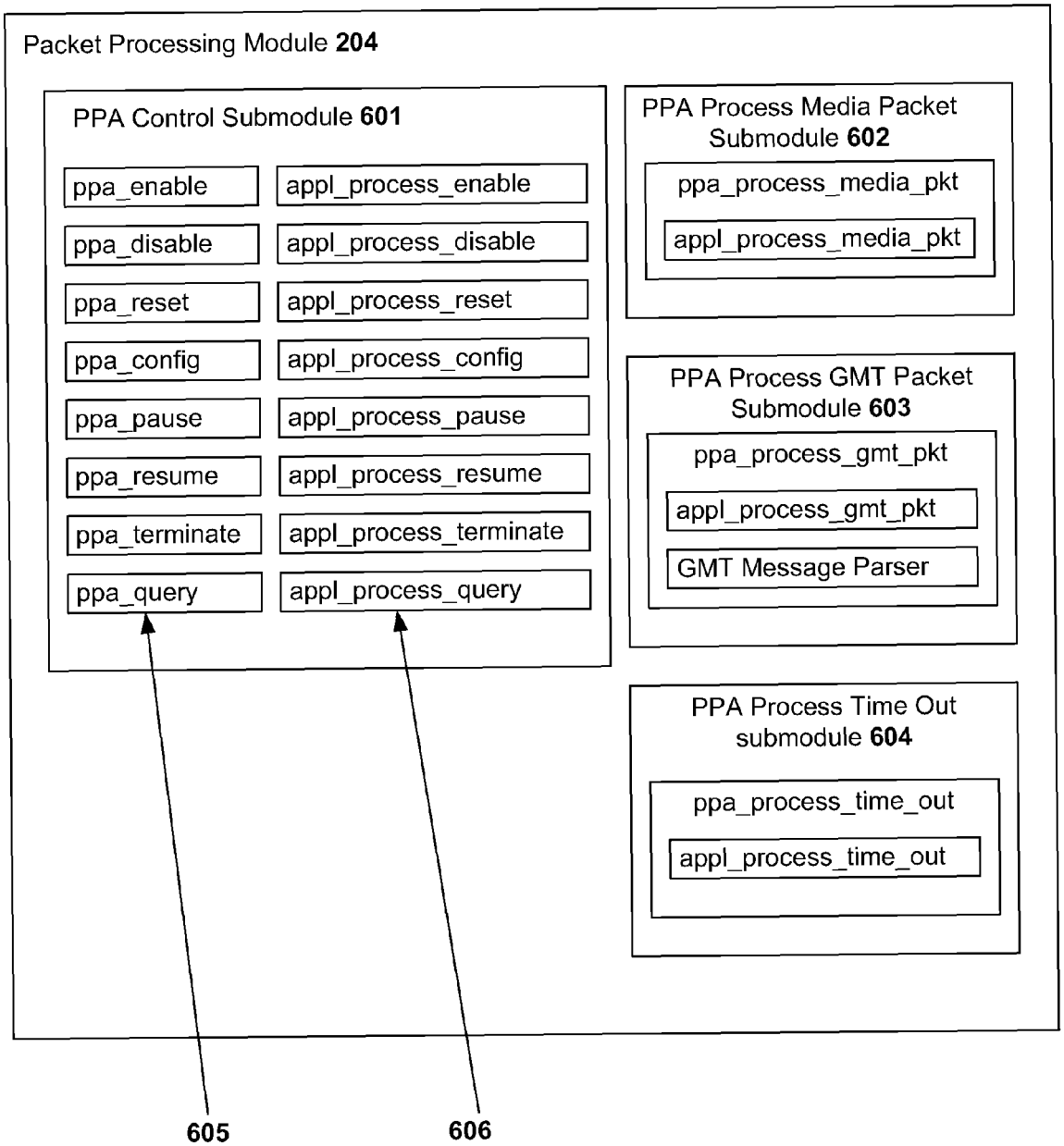
FIG. 6 illustrates in more detail the packet processing module of the docking platform in accordance with the present invention.

FIG. 6 illustrates in more detail the packet processing module 204 of the docking platform 200 in accordance with the present invention. The packet processing module 204 is divided into different submodules based on the different types of packets they handle. For example, the module 204 can include a PPA control submodule 601 for handling the GMT administration packets, a PPA process media packet submodule 602 for processing media packets, a PPA process GMT packet submodule 603 for processing GMT service packets, and a PPA process time out submodule 604, which is called when a time out occurs.

Each submodule includes functions comprising a PPA routine 605 for the docking platform 200 and an application function 606 specific to its associated application. The PPA routine 605 is common to any associated application and constitutes the entry point to the application specific function 606. It is the application specific function 606 that is plugged in by the binding of application procedures. When the docking platform 200 calls a function, the corresponding PPA routine 605 is performed. The application procedures associated with the PPA routine 605 is also called, using the function pointer that was plugged in during PPA instance initialization (step 401 of FIG. 4), to perform the application routine 606.

FIG. 6 further illustrates example functions for the packet processing module 204. The PPA control submodule 601 includes the PPA shell functions listed in the column on the left. Each of these PPA shell functions is bound respectively to an application specific function listed in the column on the right. In this example, the ppa_enable routine is called by the PPA shell 202 to enable a PPA instance. The ppa_disable routine is called by the PPA shell 202 to disable a PPA instance. The ppa_reset routine is called by the PPA shell 202 to reset a PPA instance. The ppa_config routine is called by the PPA shell 202 to load a new configuration to a PPA instance. The ppa_pause routine is called by the PPA shell 202 to pause a PPA instance. The ppa_resume routine is called by the PPA shell 202 to resume a PPA instance. The ppa_terminate routine is called by the PPA shell 202 to terminate a PPA instance. The ppa_query routine is called by the PPA shell 202 to query the PPA status.

The PPA process media packet submodule 602 includes the PPA shell function, ppa_process_media_pkt, bound to the application specific function, appl_process_media_pkt, as described above.

The PPA process GMT packet submodule 603 includes the PPA shell function, ppa_process_gmt_pkt, bound to the application specific function, appl_process_gmt_pkt, as described above. Alternatively, the GMT message parser is called when the appl_process_gmt_pkt function is not defined in the application bind table. The GMT message parser handles the processing of GMT packets using service and event handler tables bound during the creation of the PPA instance. If the appl_process_gmt_pkt function is defined, it returns to the ppa_process_gmt_pkt function after processing the GMT packet. The processing of the GMT packet could either be complete or partial. If the processing is complete, the appl_process_gmt_pkt function returns with an appropriate value. This causes the PPA shell 202 to remain in the "enabled-wait_any" state and dequeue the next packet from the ingress queue using step 402 and process it using step 403. Partial processing of a GMT packet is necessitated by the fact that in order to process the incumbent GMT packet, the PPA instance may need to send another GMT packet to a different PPA instance and wait for a response from the latter. In such cases, the appl_process_gmt_pkt function creates and transmits a new GMT service request packet to another PPA instance, using the transmit GMT packet module 702, and then returns to the ppa_process_gmt_pkt function with a return code indicating that it wants to wait for a GMT service response packet. It also provides the duration to wait. This causes the PPA shell 202 to transition to the "enabled-wait_resp" state and start a timer whose duration is as specified by the appl_process_gmt_pkt function. While in this state, the PPA shell 202 only dequeues GMT service response packets or GMT administration packets from the ingress queue using step 402. If a GMT service response packet is received before the expiration of the timer, the PPA shell 202 stops the timer, transitions the state to "enabled-wait_any" and invokes the ppa_process_gmt_pkt function which in turn calls the appl_process_gmt_pkt function with the GMT service response packet as a parameter. If the timer expires before a GMT service response packet is received, the ppa_process_timeout function is invoked, which in turn calls the appl_process_time_out function. The states of a PPA instance are further described below with FIG. 8.

The PPA process time out submodule 604 includes the PPA shell function, ppa_process_timeout, bound to the application specific function, appl_process_time_out. The PPA shell 202 invokes the ppa_process_timeout function only while in the "enabled_wait_resp" and the wait timer expires. The ppa_process_timeout function in turn invokes the appl_process_time_out function. The latter, after performing any application-specific time out activity, returns to the ppa_process_timeout function with an appropriate return value indicating whether the PPA shell 202 should restart the timer and continue to wait for a GMT service response packet, abandon waiting and dequeue the next packet from the ingress queue using step 402 for processing using step 403, or continue processing the incumbent GMT service request packet. In the first case, the PPA shell 202 restarts the timer and continues to remain in the "enabled-wait_resp" state. In the second case, the PPA shell 202 transitions to the "enabled-wait_any" state, dequeues the next packet from the ingress queue using step 402 and processes the packet using step 403. In the third case, the PPA shell 202 transitions to the "enabled-wait_any" state and invokes the ppa_process_gmt_pkt function (which in turn invokes the appl_process_gmt_packet function) with null parameters since the incumbent GMT packet is already known to the application.

Once the processing of a packet is completed, the packet is transmitted out of the docking platform 200 through the egress connector 203. The egress connector 203 defines a common set of interfaces for packet transmission. The interfaces allow applications to handle all packets that are likely to be encountered regardless of whether the transmission decision is to send or discard, whether the transmission mode is unicast or multicast, and whether the packet is a data stream or control information.

Figure 7:
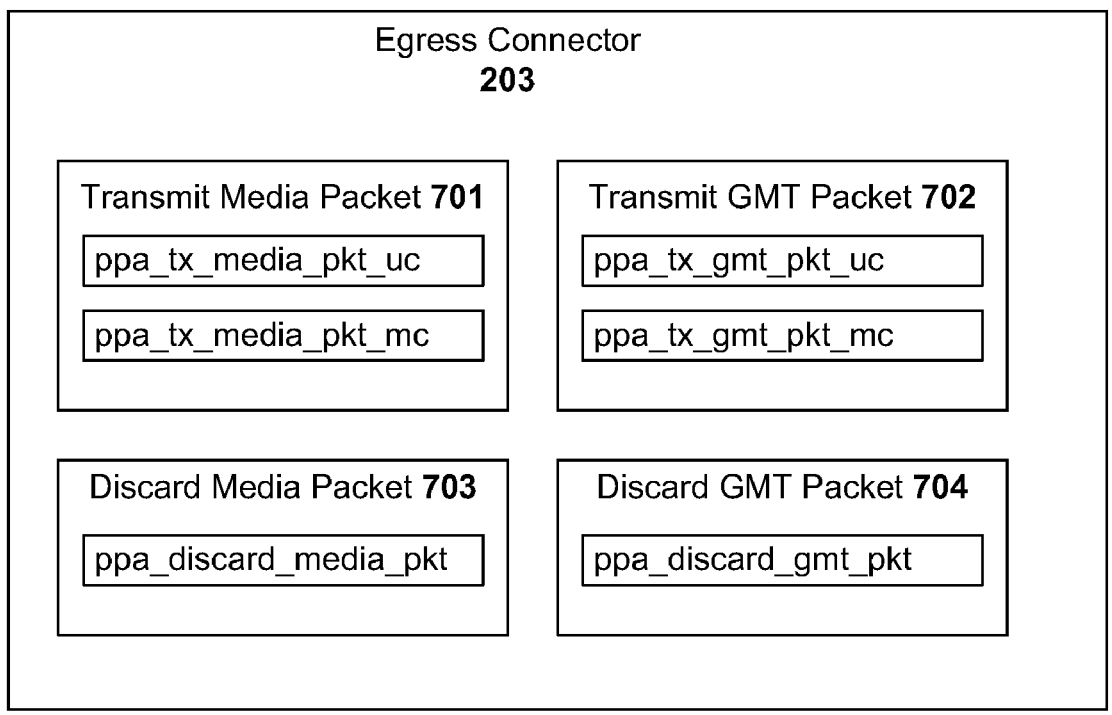
FIG. 7 illustrates in more detail the egress connector of the docking platform in accordance with the present invention.

FIG. 7 illustrates in more detail the egress connector 203 of the docking platform 200 in accordance with the present invention. The egress connector 203 comprises a transmit media packet module 701, a transmit GMT packet module 702, a discard media packet module 703, and a discard GMT packet module 704. The transmit media packet module 701 transmits a processed packet through the media port 114 or to an ingress connector 113 of another PPA instance, in unicast or multicast mode. The transmit GMT packet module 702 transmits a processed packet through its own GMT port 115 in unicast or multicast mode, or the GMT ports of multiple PPA instances in multicast mode. The discard media packet module 703 and the discard GMT packet module 704 discard processed media and GMT packets, respectively.

FIG. 7 further illustrates example functions for the modules of the egress connector 203. In this example, the transmit media packet module 701 includes the ppa_tx_media_pkt_uc function, called by the egress connector 203 to transmit a media packet in unicast mode, and the ppa_tx_media_pt_mc function, called by the egress connector 203 to transmit a media packet in multicast mode.

The transmit GMT packet module 702 includes the ppa_tx_mt_pkt_uc function, called by the egress connector 203 to transmit a GMT packet in unicast mode, and the ppa_tx_gmt_pkt_mc function, called by the egress connector 203 to transmit a GMT packet in multicast mode.

The discard media packet module 703 includes the ppa_discard_media_pkt function, called by the egress connector to discard a media packet. The discard GMT packet module 704 includes the ppa_discard_gmt_pkt function, called by the egress connector 203 to discard a GMT packet.

Although the preferred embodiment of the present invention is described above in the context of media and GMT packets, one of ordinary skill in the art will understand that other types of packets may be used without departing from the spirit and scope of the present invention.

Although the present invention is described with the above example functions and routines, one of ordinary skill in the art will understand that other functions and/or routines may be used without departing from the spirit and scope of the present invention.

Figure 8:
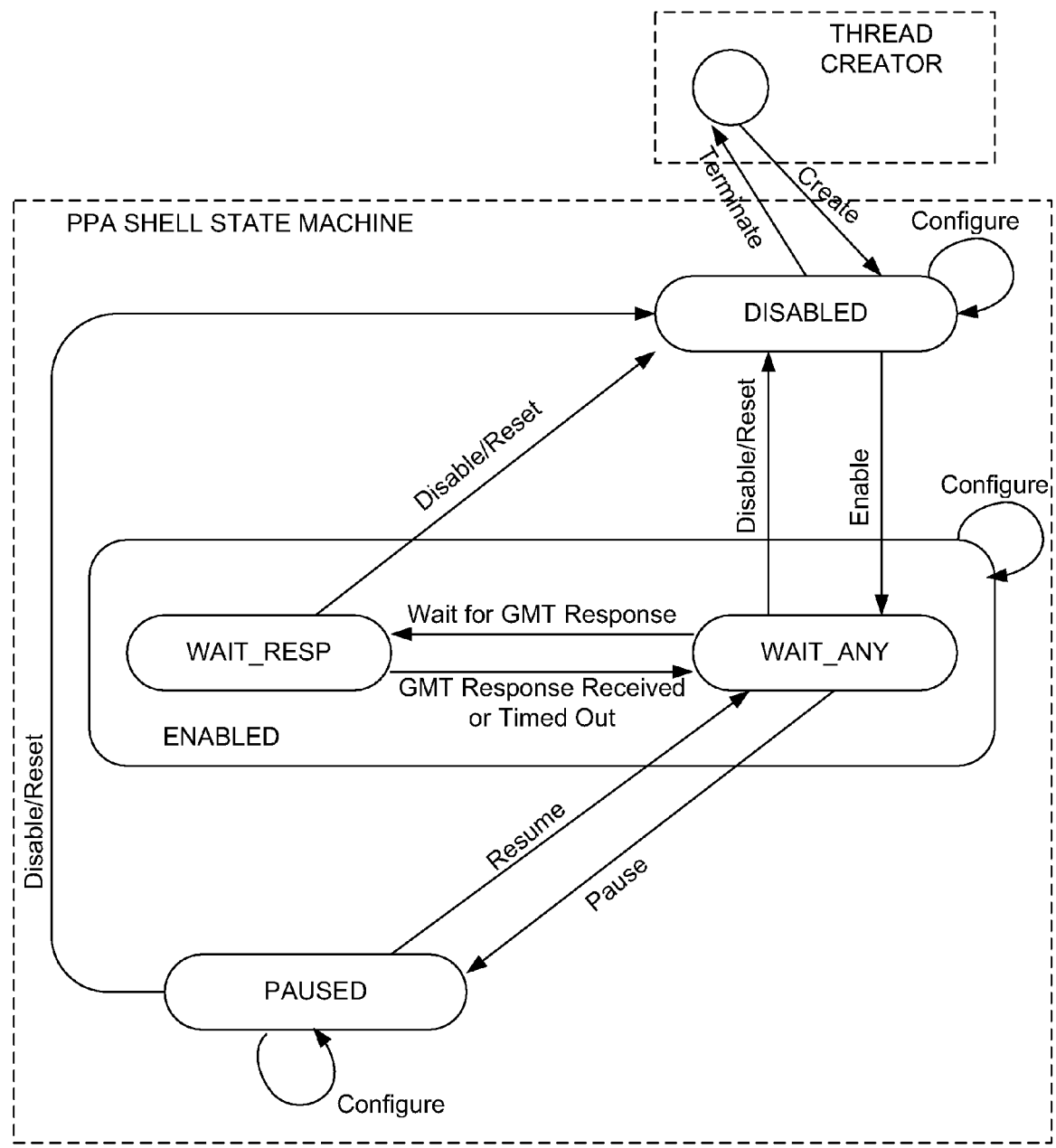
FIG. 8 illustrates a state model of a PPA instance with the preferred embodiment of the docking platform for portable packet processing for network processor applications in accordance with the present invention.

By using the above functionality, the docking platform 200 manages the overall states of the PPA shell 202. FIG. 8 illustrates a state model of the PPA shell 202 with the preferred embodiment of the docking platform for portable packet processing for network processor applications in accordance with the present invention. The docking platform 200 supports five types of GMT packets: administration requests, administration responses, services requests, services responses, and event notification. By sending information through these five types of packets, a user can control the state of the PPA shell 202 and the application bound to it.

An instance of a docking platform 200 is created by a root thread. At this time, the PPA shell 202 associated with the docking platform 200 instance is in the "disabled" state. Subsequently, the PPA shell 202 can assume one of four states:

enabled-wait_any: This is the normal working state of the PPA shell 202. In this state, PPA shell 202 continues to process packets from an ingress queue.

enabled-wait_resp: This is a special working state of the PPA shell 202. During packet processing, a GMT service request packet may need to be sent to another PPA shell 202 (associated with another instance of a docking platform 200) in order to finish processing the packet. In this state, the docking platform 200 waits for a response from the other PPA shell 202.

disabled: This is the non-working state of the PPA shell 202. Applications in this state cannot handle any packets. The PPA shell 202 in this state processes only GMT administration request packets. When the PPA shell 202 transitions from the "enabled" to the "disabled" state, all packets in the ingress queue, except for administration requests, are flushed.

paused: This is the temporary halt state of the PPA shell 202. The PPA shell 202 in this state handles only GMT administration request packets. The difference between the "paused" state and the "disabled" state is that packets in the ingress queue(s) are not flushed in the "paused" state.

Events that trigger state transition include the following:

administration request to enable PPA: With this request, the PPA instance transitions to the "enabled" state, if the PPA instance is in the "disabled" state. All previously configured values take effect during this transition.

administration request to disable PPA: With this request, the PPA shell 202 transitions from any state to the "disabled" state. All queues are also flushed except for those containing administration requests.

administration request to reset PPA: With this request, the PPA shell 202 resets and transitions from any state to the "disabled" state. All configuration parameters are initialized to default values and, if not subsequently altered, will take effect during the next transition to the "enabled" state.

administration request to configure PPA: With this request, the new configuration parameters are loaded into the PPA shell 202. This can be handled from any state, and the state of the PPA instance does not change. The new configuration parameters do not take effect until the next transition to the "enabled" state.

administration request to pause PPA: With this request, the PPA instance transitions from the "enabled-wait any" stated to the "pause" state.

administration request to resume PPA: With this request, the PPA instance transitions from the "pause" state to the "enabled-wait-any" state.

Although the preferred embodiment of the present invention is described with the above states, one of ordinary skill in the art will understand that other states may be possible without departing from the spirit and scope of the present invention.

A method and apparatus for developing portable packet processing applications on network processor have been disclosed. The preferred embodiment includes a docking platform which provides a common interface for individual applications to be plugged into the processing environment. Each application interacts with the docking platform through the common interfaces. The docking platform interacts with the other modules inside the system to accomplish the requests from the application. In this manner, the applications become "shielded" from the implementation details of the hardware. The applications need not change when the network processor hardware features are changed. It therefore provides a universal packet processing programming environment in which applications can execute in a portable and flexible manner in various hardware architectures.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. The computer-readable medium may be a computer-readable storage medium such as memory or CD-ROM that is executed by a processor. Accordingly, many modifications may be made by one of ordinary skill in the art without departing from the spirit and scope of the appended claims.

What is claimed is:

1. A docking platform for network processor applications, the docking platform comprising:

an ingress connector for packet entry, wherein the ingress connector receives a packet from a network processor application, wherein the ingress connector is not specific to the network processor application; and a packet processing application (PPA) shell that processes the packet wherein the PPA shell is an application that binds application procedures for its associated applications, the PPA shell comprising a plurality of interfaces between the docking platform and the network processor application, wherein the plurality of interfaces is not specific to the network processor application, wherein the plurality of interfaces are used to invoke at least one of a plurality of functions utilizing one of the plurality of interfaces, wherein the plurality of functions is specific to the network processor application, wherein the PPA shell, prior to the receiving the packet, binds each of the plurality of functions to one of the plurality of interfaces.

2. The docking platform of claim 1 wherein the ingress connector:
enqueues the packet onto an ingress queue; and
dequeues the packet when called by the PPA shell.

3. The docking platform of claim 1 wherein the PPA shell:
calls one of the plurality of interfaces corresponding to a request in the packet; and
invokes one of the plurality of functions bound to the called interface.

4. The docking platform of claim 1 further comprises an egress connector for transmitting the processed packet, wherein the egress connector is not specific to the network processor application.

5. The docking platform of claim 1, wherein the PPA shell binds the application procedures for its associated applications using a procedure bind table the contains function pointers to the application procedures.

6. The docking platform of claim 5, wherein the procedure bind table further comprises pointers to application data context and application control context, wherein the application data context comprises data structures defined and used by the application procedures during media packet processing, and the application control context comprises data structures defined and used during generic message transfer (GMT) packet processing.

7. A method implemented by a computer comprising a data processor and a memory for processing packets for network processor applications, the method comprising:
the computer receiving a packet at an ingress connector of a docking platform from a network processor application, wherein the ingress connector is not specific to the network processor application; and
the computer processing the packet by a PPA shell, wherein the PPA shell is an application that binds application procedures for its associated application, the PPA shell comprising a plurality of interfaces between the docking platform and the network processor application, wherein the plurality of interfaces is not specific to the network processor application,
wherein the processing comprises invoking at least one of the plurality of functions utilizing one of the plurality of interfaces, wherein the plurality of functions is specific to the network processor application, wherein, prior to the receiving, the method further comprises initializing the docking platform, wherein the initializing comprises binding each of the plurality of functions to one of the plurality of interfaces.

8. The method of claim 7 wherein the receiving comprises:
enqueuing the packet onto an ingress queue; and
dequeuing the packet when called by the PPA shell.

9. The method of claim 7 wherein the processing comprises:
calling one of the plurality of interfaces corresponding to a request in the packet; and
invoking one of the plurality of functions bound to the called interface.

10. The method of claim 7 further comprising transmitting the processed packet by an egress connector, wherein the egress connector is not specific to the network processor application.

11. The method of claim 7, wherein the PPA shell binds the application procedures for its associated applications using a procedure bind table the contains function pointers to the application procedures.

12. The method of claim 11, wherein the procedure bind table further comprises pointers to application data context and application control context, wherein the application data context comprises data structures defined and used by the application procedures during media packet processing, and the application control context comprises data structures defined and used during generic message transfer (GMT) packet processing.

* * * * *